United States Patent
Zhu et al.

(10) Patent No.: US 12,513,595 B2
(45) Date of Patent: Dec. 30, 2025

(54) COMMUNICATION METHOD AND COMMUNICATION APPARATUS

(71) Applicant: HUAWEI TECHNOLOGIES CO., LTD., Shenzhen (CN)

(72) Inventors: Haoren Zhu, Shanghai (CN); Huan Li, Shenzhen (CN); Weisheng Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 379 days.

(21) Appl. No.: 17/896,195

(22) Filed: Aug. 26, 2022

(65) Prior Publication Data
US 2022/0408341 A1 Dec. 22, 2022

Related U.S. Application Data

(63) Continuation of application No. PCT/CN2020/077235, filed on Feb. 28, 2020.

(51) Int. Cl.
| | |
|---|---|
| *H04W 40/22* | (2009.01) |
| *H04L 45/00* | (2022.01) |
| *H04W 8/08* | (2009.01) |
| *H04W 28/02* | (2009.01) |
| *H04W 40/24* | (2009.01) |

(52) U.S. Cl.
CPC .............. *H04W 40/22* (2013.01); *H04L 45/00* (2013.01); *H04W 40/246* (2013.01); *H04W 8/08* (2013.01); *H04W 28/0268* (2013.01)

(58) Field of Classification Search
CPC ............... H04W 40/22; H04W 40/246; H04W 28/0226; H04W 48/20; H04W 76/10; H04W 84/042; H04W 88/08; H04W 48/16; H04L 45/00; H04L 45/74
See application file for complete search history.

(56) References Cited

U.S. PATENT DOCUMENTS

| | | | |
|---|---|---|---|
| 11,876,777 B2 * | 1/2024 | Akl | H04W 40/36 |
| 12,192,816 B2 * | 1/2025 | Wang | H04W 76/12 |
| 12,219,458 B2 * | 2/2025 | Zhu | H04L 9/40 |

(Continued)

FOREIGN PATENT DOCUMENTS

| | | |
|---|---|---|
| CN | 101808361 A | 8/2010 |
| CN | 102264114 A | 11/2011 |

(Continued)

OTHER PUBLICATIONS

Sony, Local route selection in IAB. 3GPP TSG RAN WG2 Meeting #108, Reno, USA, Nov. 18-22, 2019, R2-1915226, 2 pages.
(Continued)

*Primary Examiner* — Brian T O Connor
(74) *Attorney, Agent, or Firm* — HAUPTMAN HAM, LLP

(57) ABSTRACT

A communication method includes an integrated access and backhaul IAB donor node that receives a first message from a core network network element, where the first message indicates to establish a local route between a first node and a second node, and the first node is an IAB node; and the IAB donor node determines a local routing node based on the first message, where a data packet between the first node and the second node is locally forwarded by using the local routing node. This method reduces data bypassing and reduce a communication latency.

20 Claims, 7 Drawing Sheets

(56) References Cited

U.S. PATENT DOCUMENTS

| | | | |
|---|---|---|---|
| 12,232,151 B2* | 2/2025 | You | H04W 72/0446 |
| 12,238,744 B2* | 2/2025 | Ying | H04W 72/23 |
| 2020/0351874 A1* | 11/2020 | Luo | H04L 5/0032 |
| 2021/0152515 A1* | 5/2021 | Akl | H04W 36/305 |
| 2022/0015093 A1* | 1/2022 | Ying | H04B 7/15542 |
| 2022/0141752 A1* | 5/2022 | Miao | H04L 45/54 370/328 |
| 2023/0422096 A1* | 12/2023 | Mao | H04W 28/086 |
| 2024/0106796 A1* | 3/2024 | Akl | H04L 61/5076 |
| 2024/0137837 A1* | 4/2024 | Tesanovic | H04W 28/0268 |
| 2024/0236811 A9* | 7/2024 | Tesanovic | H04L 45/48 |
| 2025/0031254 A1* | 1/2025 | Maya | H04W 76/10 |

FOREIGN PATENT DOCUMENTS

| | | |
|---|---|---|
| CN | 110351700 A | 10/2019 |
| WO | 2011130920 A1 | 10/2011 |
| WO | 2019216670 A1 | 11/2019 |

OTHER PUBLICATIONS

3GPP TS 22.104 V17.2.0 (Dec. 2019), 3rd Generation Partnership Project; Technical Specification Group Services and System Aspects; Service requirements for cyber-physical control applications in vertical domains; Stage 1(Release 17), 76 pages.

LG Electronics Inc., Consideration on local route selection in IAB node. 3GPP TSG-RAN WG2 Meeting #107bis, Chongqing, China, Oct. 14-18, 2019, R2-1913820, 2 pages.

3GPP TS 33.501 V16.1.0 (Dec. 2019), 3rd Generation Partnership Project; Technical Specification Group Services and System Aspects; Security architecture and procedures for 5G system(Release 16), 202 pages.

International Search Report issued in corresponding International Application No. PCT/CN2020/077235, mailed Nov. 30, 2020, pp. 1-12.

Samsung, Discussion on the local route/path selection. 3GPP TSG-RAN WG2 Meeting #106, Reno, Nv, USA, May 13-May 17, 2019, R2-1906964, 4 pages.

Nokia, Nokia Shanghai Bell, Architecture and Protocols: Connectivity Service Solution for IAB. 3GPP TSG-RAN WG2 Meeting #101bis, Sanya, China, Apr. 16-20, 2018, R2-1805702, 6 pages.

ATandT, Remaining details of BAP layer routing. 3GPP TSG-RAN WG2 Meeting #107, Prague, Czech Republic, Aug. 26-30, 2019, R2-1910771, 4 pages.

Extended European Search Report issued in corresponding European Application No. 20921677.9, dated Dec. 20, 2022, pp. 1-11.

Chinese Office Action issued in corresponding Chinese Application No. 202080096744.1, dated Aug. 13, 2024, pp. 1-13.

* cited by examiner

S250: Establish the local route between the first IAB node and the second node

S260: Send a data packet, where a destination address of the data packet is the second node S270: Determine, based on the destination address and the local routing information, to locally forward the data packet S280: Forward the data packet sent by the first IAB node

FIG. 2B

COMMUNICATION METHOD AND COMMUNICATION APPARATUS

CROSS-REFERENCE TO RELATED APPLICATIONS

This application is a continuation of International Application No. PCT/CN2020/077235, filed on Feb. 28, 2020, the disclosure of which is hereby incorporated in entirety by reference.

BACKGROUND

In a wireless backhaul network, for example, an integrated access and backhaul (integrated access and backhaul, IAB) network mainly includes a wireless backhaul node (which further is referred to as an IAB node (IAB node) or a relay node (relay node, RN)) and a donor node of the wireless backhaul node. The IAB network supports multi-hop backhaul. Wireless backhaul nodes are cascaded in a spanning tree or directed acyclic graph manner. The wireless backhaul node provides a wireless access service and a wireless backhaul service for a terminal device. Data of the terminal device is transmitted by the wireless backhaul node to a donor (donor) node through a wireless backhaul link, and then transmitted by the donor node to a data network by using a core network. Therefore, the data of the terminal device reaches the data network after passing through a multi-hop wireless backhaul node, the donor node, and the core network. For such a transmission mode to meet a low-latency service threshold of the terminal device is difficult.

SUMMARY

In some embodiments, a communication method and a communication apparatus, to reduce data bypassing and further reduce a communication latency.

According to a first aspect, a communication method is provided. The method is performed by an IAB donor node or a module (such as a chip) disposed on the IAB donor node. The following uses an example in which the method is performed by the IAB donor node for description.

This method includes: An integrated access and backhaul IAB donor node receives a first message from a core network network element, where the first message indicates to establish a local route between a first node and a second node, and the first node is an IAB node; and the IAB donor node determines a local routing node based on the first message, where the local route means that a data packet between the first node and the second node is locally forwarded by using the local routing node.

According to the foregoing solution, after receiving the first message sent by a core network device, the IAB donor node determines to establish the local route between the first node and the second node, and selects a local routing node that provides a local routing service for the first node and the second node, so that the data packet between the first node and the second node is locally forwarded by using the local routing node without passing through an upper-layer node of the local routing node. This reduces data bypassing and further reduces a communication latency.

With reference to the first aspect, in some implementations of the first aspect, the first message includes one or more of the following: an identifier of the first node, an identifier of the second node, or a group identifier of the node group to which the second node belongs.

According to the foregoing solution, the IAB donor node determines, by using the identifier in the first message, a node that needs to establish the local route.

With reference to the first aspect, in some implementations of the first aspect, the first node is a node that accesses a network by using a 3rd Generation Partnership Project 3GPP access technology, and the first node provides a relay service for a device that accesses the network by using a non-3GPP access technology.

According to the foregoing solution, the first node accesses a 3GPP network by using the 3GPP access technology, and the first node provides the relay service for a device that establishes a connection to the first node by using the non-3GPP access technology, so that the device that establishes the connection to the first node by using the non-3GPP access technology performs data transmission by using the local route between the first node and the second node, so that the device that accesses the network by using the non-3GPP technology establishes a local route with a node in the 3GPP network. This reduces data bypassing, avoid a waste of transmission bandwidth, reduce a transmission error probability, and reduce a communication latency.

With reference to the first aspect, in some implementations of the first aspect, that the IAB donor node determines a local routing node based on the first message includes: The IAB donor node determines the local routing node based on the first message and a topology relationship between lower-layer nodes of the IAB donor node, where the local routing node is a common upper-layer node of the first node and the second node.

According to the foregoing solution, the IAB donor node determines, based on the first message and the topology relationship between the lower-layer nodes of the IAB donor node, a common upper-layer node of the first node and the second node as the local routing node that provides the local routing service, so that the data packet between the first node and the second node is locally forwarded by using the local routing node. This reduces data bypassing, avoid a waste of transmission bandwidth, reduce a transmission error probability, and reduce a communication latency.

With reference to the first aspect, in some implementations of the first aspect, the local routing node is a smallest common upper-layer node of the first node and the second node.

According to the foregoing solution, as the local route between the first node and the second node, the smallest common upper-layer node achieves a shortest data transmission path. This reduces data bypassing to a greatest extent, avoid a waste of transmission bandwidth, reduce a transmission error probability, and reduce a communication latency.

With reference to the first aspect, in some implementations of the first aspect, the local routing node is the IAB node or the LAB donor node.

According to the foregoing solution, the IAB node or the IAB donor node is used as the local routing node that provides the local routing service for the first node and the second node. This reduces data bypassing, avoid a waste of transmission bandwidth, reduce a transmission error probability, and reduce a communication latency.

With reference to the first aspect, in some implementations of the first aspect, the local routing node is the IAB node, where the method further includes: The IAB donor node sends a second message to the local routing node, where the second message indicates to establish the local route between the first node and the second node.

According to the foregoing solution, the IAB donor node notifies, by using the second message, the local routing node to establish the local route between the first node and the second node, so that the data packet between the first node and the second node is locally forwarded by using the local routing node. This reduces data bypassing, avoid a waste of transmission bandwidth, reduce a transmission error probability, and reduce a communication latency.

With reference to the first aspect, in some implementations of the first aspect, the second message includes one or more of the following: the identifier of the first node, the identifier of the second node, or the group identifier of the node group to which the second node belongs.

According to the foregoing solution, the local routing node determines, by using the identifier in the second message, a node that needs to establish the local route.

With reference to the first aspect, in some implementations of the first aspect, the local routing node is the IAB donor node, where the method further includes: The IAB donor node starts route learning for the first node; and/or the IAB donor node generates a route forwarding table between the first node and the second node.

Optionally, that the IAB donor node starts route learning for the first node is that the IAB donor node learns of a MAC address or an IP address of the first node, or the IAB donor node learns of a MAC address or an IP address of a terminal device that accesses the first node by using the non-3GPP access technology.

According to the foregoing solution, when the node that provides the local routing service for the first node and the second node is the IAB donor node, the IAB donor node starts route learning for the first node, so that the data packet between the first node and the second node is locally forwarded by using the local routing node. This reduces data bypassing, avoid a waste of transmission bandwidth, reduce a transmission error probability, and reduce a communication latency.

With reference to the first aspect, in some implementations of the first aspect, the second node includes a terminal device and/or the IAB node.

According to the foregoing solution, a local route is established between IAB nodes and between the IAB node and the terminal device. This reduces data bypassing, avoid a waste of transmission bandwidth, reduce a transmission error probability, and reduce a communication latency.

With reference to the first aspect, in some implementations of the first aspect, this method further includes: The IAB donor node receives a third message from the core network network element, where the third message indicates to delete the local route between the first node and the second node; and the IAB donor node sends a fourth message to the local routing node, where the fourth message indicates the local routing node to delete the local route between the first node and the second node.

According to the foregoing solution, a local routing relationship between the nodes are deleted by using the third message, to restore communication in a current technology, so that a communication manner is flexibly switched based on a network status or a communication status.

According to a second aspect, a communication method is provided. The method is performed by a core network network element or a module (such as, a chip) disposed in the core network network element. The following uses an example in which the method is performed by the core network network element for description.

The method includes: A core network network element receives a fifth message from an application function AF network element, where the fifth message is used to request to establish a local route between a first node and a second node, the first node is an integrated access and backhaul IAB node, and the local route means that a data packet between the first node and the second node is locally forwarded by using a local routing node; and the core network network element sends a first message to an IAB donor node, where the first message indicates to establish the local route between the first node and the second node.

With reference to the second aspect, in some implementations of the second aspect, the first message and/or the fifth message include/includes one or more of the following: an identifier of the first node, an identifier of the second node, or a group identifier of a node group to which the second node belongs.

With reference to the second aspect, in some implementations of the second aspect, the local routing node is the IAB node or the IAB donor node.

With reference to the second aspect, in some implementations of the second aspect, the second node includes a terminal device and/or the IAB node.

With reference to the second aspect, in some implementations of the second aspect, the first node is a node that accesses a network by using a 3GPP access technology, and the first node provides a relay service for a device that accesses the network by using a non-3GPP access technology.

With reference to the second aspect, in some implementations of the second aspect, the method further includes: The core network network element generates association information between the first node and the second node; or the core network network element generates association information between the first node and the node group to which the second node belongs.

According to the foregoing solution, that the core network network element generates the association information helps establish the local route between the first node and the second node, and this reduces a communication latency.

With reference to the second aspect, in some implementations of the second aspect, the method further includes: The core network network element receives a sixth message from the AF network element, where the sixth message is used to request to delete the local route between the first node and the second node; and the core network network element sends a seventh message to the IAB donor node, where the seventh message indicates to delete the local route between the first node and the second node.

According to a third aspect, a communication method is provided. The method is performed by a local routing node or a module (such as a chip) disposed on the local routing node. The following uses an example in which the method is performed by the local routing node for description.

The method includes: A local routing node receives a second message sent by an integrated access and backhaul IAB donor node, where the second message indicates to establish a local route between a first node and a second node, and the first node is an IAB node; and the local routing node establishes the local route between the first node and the second node based on the second message, where the local route means that a data packet between the first node and the second node is locally forwarded by using the local routing node.

With reference to the third aspect, in some implementations of the third aspect, the second message includes one or more of the following: an identifier of the first node, an identifier of the second node, or a group identifier of a node group to which the second node belongs.

With reference to the third aspect, in some implementations of the third aspect, the local routing node is the IAB node or the IAB donor node.

With reference to the third aspect, in some implementations of the third aspect, the second node includes a terminal device and/or the IAB node.

With reference to the third aspect, in some implementations of the third aspect, the first node is a node that accesses a network by using a 3GPP access technology, and the first node provides a relay service for a device that accesses the network by using a non-3GPP access technology.

With reference to the third aspect, in some implementations of the third aspect, the method further includes: The local routing node starts route learning for the first node; and/or the local routing node generates a route forwarding table between the first node and the second node.

With reference to the third aspect, in some implementations of the third aspect, the method further includes: The local routing node receives a data packet in a first format from the first node, where the first format corresponds to the 3GPP access technology, the data packet in the first format includes data sent by a third node to the second node, and the third node is a node that establishes a wireless connection to the first node by using the non-3GPP access technology; and the local routing node locally forwards the data packet in the first format to the second node.

According to the foregoing solution, the local routing node locally forwards the data packet of the first node, and the data packet does not pass through an upper-layer node of the local routing node. This reduces data bypassing, avoid a waste of transmission bandwidth, reduce a transmission error probability, and reduce a communication latency.

With reference to the third aspect, in some implementations of the third aspect, the first format corresponds to user plane configuration of the first node.

According to a fourth aspect, a communication method is provided. The method is performed by a first node or a module (such as a chip) disposed on the first node. The following uses an example in which the method is performed by a local routing node for description.

The method includes: A first node receives a data packet in a second format sent by a third node, where the data packet in the second format includes first data, the first data is data sent by the third node to a second node, the first node is an integrated access and backhaul IAB node, a local route has been established between the first node and the second node, and the local route means that a data packet between the first node and the second node is locally forwarded by using a local routing node; and the first node sends a data packet in a first format to the local routing node, where the data packet in the first format includes the first data.

With reference to the fourth aspect, in some implementations of the fourth aspect, the method further includes:

The first node performs format conversion on the data packet in the second format to obtain the data packet in the first format.

With reference to the fourth aspect, in some implementations of the fourth aspect, the first node and/or the second node are/is a node that accesses a network by using a 3GPP access technology, and the first format corresponds to the 3GPP access technology.

With reference to the fourth aspect, in some implementations of the fourth aspect, the first format corresponds to user plane configuration of the first node.

With reference to the fourth aspect, in some implementations of the fourth aspect, the third node is a node that establishes a wireless connection to the first node by using a non-3GPP access technology, and the second format corresponds to the non-3GPP access technology.

With reference to the fourth aspect, in some implementations of the fourth aspect, the local routing node is the IAB node or an IAB donor node.

With reference to the fourth aspect, in some implementations of the fourth aspect, the second node includes a terminal device and/or the IAB node.

According to a fifth aspect, a communication apparatus is provided, including: a transceiver unit, configured to receive a first message from a core network network element, where the first message indicates to establish a local route between a first node and a second node, and the first node is an integrated access and backhaul IAB node; and a processing unit, configured to determine a local routing node based on the first message, where the local route means that a data packet between the first node and the second node is locally forwarded by using the local routing node.

With reference to the fifth aspect, in some implementations of the fifth aspect, the first message includes one or more of the following: an identifier of the first node, an identifier of the second node, or a group identifier of a node group to which the second node belongs.

With reference to the fifth aspect, in some implementations of the fifth aspect, the first node is a node that accesses a network by using a 3GPP access technology, and the first node provides a relay service for a device that accesses the network by using a non-3GPP access technology.

With reference to the fifth aspect, in some implementations of the fifth aspect, the processing unit is configured to determine the local routing node based on the first message and a topology relationship between lower-layer nodes of an IAB donor node, where the local routing node is a common upper-layer node of the first node and the second node.

With reference to the fifth aspect, in some implementations of the fifth aspect, the local routing node is a smallest common upper-layer node of the first node and the second node.

With reference to the fifth aspect, in some implementations of the fifth aspect, the local routing node is the IAB node or the IAB donor node.

With reference to the fifth aspect, in some implementations of the fifth aspect, the local routing node is the IAB node; and the transceiver unit is further configured to send a second message to the local routing node, where the second message indicates to establish the local route between the first node and the second node.

With reference to the fifth aspect, in some implementations of the fifth aspect, the second message includes one or more of the following: the identifier of the first node, the identifier of the second node, or the group identifier of the node group to which the second node belongs.

With reference to the fifth aspect, in some implementations of the fifth aspect, the local routing node is the IAB donor node, and the processing unit is further configured to start route learning for the first node; and/or the processing unit is further configured to generate a route forwarding table between the first node and the second node.

With reference to the fifth aspect, in some implementations of the fifth aspect, the second node includes a terminal device and/or the IAB node.

With reference to the fifth aspect, in some implementations of the fifth aspect, the transceiver unit is further configured to receive a third message sent by the core network network element, where the third message indicates to delete the local route between the first node and the second node. The transceiver unit is further configured to send a fourth message to the local routing node, where the fourth message indicates the local routing node to delete the local route between the first node and the second node.

According to a sixth aspect, a communication apparatus is provided, including a processor. The processor is coupled to a memory, and is configured to execute instructions in the memory, to implement the foregoing method according to any one of the first aspect and the possible implementations of the first aspect. Optionally, the communication apparatus further includes the memory. Optionally, the communication apparatus further includes a communication interface, and the processor is coupled to the communication interface.

In some embodiments, the communication apparatus is an IAB donor node. When the communication apparatus is the IAB donor node, the communication interface is a transceiver or an input/output interface.

In some embodiments, the communication apparatus is a chip disposed on the IAB donor node. When the communication apparatus is the chip disposed on the IAB donor node, the communication interface is an input/output interface.

Optionally, the transceiver is a transceiver circuit. Optionally, the input/output interface is an input/output circuit.

According to a seventh aspect, a communication apparatus is provided, including: a transceiver unit, configured to receive a fifth message from an application function AF network element, where the fifth message is used to request to establish a local route between a first node and a second node, the first node is an integrated access and backhaul IAB node, and the local route means that a data packet between the first node and the second node is locally forwarded by using a local routing node; and a processing unit, configured to determine, based on the fifth message, to establish the local route between the first node and the second node. The transceiver unit is further configured to send a first message to an IAB donor node, where the first message indicates to establish the local route between the first node and the second node.

With reference to the seventh aspect, in some implementations of the seventh aspect, the first message and/or the fifth message include/includes one or more of the following: an identifier of the first node, an identifier of the second node, or a group identifier of a node group to which the second node belongs.

With reference to the seventh aspect, in some implementations of the seventh aspect, the local routing node is the IAB node or the IAB donor node.

With reference to the seventh aspect, in some implementations of the seventh aspect, the second node includes a terminal device and/or the IAB node.

With reference to the seventh aspect, in some implementations of the seventh aspect, the first node is a node that accesses a network by using a 3GPP access technology, and the first node provides a relay service for a device that accesses the network by using a non-3GPP access technology.

With reference to the seventh aspect, in some implementations of the seventh aspect, the processing unit is further configured to generate association information between the first node and the second node; or the processing unit is further configured to generate association information between the first node and the node group to which the second node belongs.

With reference to the seventh aspect, in some implementations of the seventh aspect, the transceiver unit is further configured to receive a sixth message sent by the AF network element, where the sixth message is used to request to delete the local route between the first node and the second node; and the transceiver unit is further configured to send a seventh message to the IAB donor node, where the seventh message indicates to delete the local route between the first node and the second node.

According to an eighth aspect, a communication apparatus is provided, including a processor. The processor is coupled to a memory, and is configured to execute instructions in the memory, to implement the foregoing method according to any one of the second aspect and the possible implementations of the second aspect. Optionally, the communication apparatus further includes the memory. Optionally, the communication apparatus further includes a communication interface, and the processor is coupled to the communication interface.

In some embodiments, the communication apparatus is a core network network element. When the communication apparatus is the core network network element, the communication interface is a transceiver or an input/output interface.

In some embodiments, the communication apparatus is a chip disposed in the core network network element. When the communication apparatus is the chip disposed in the core network network element, the communication interface is an input/output interface.

Optionally, the transceiver is a transceiver circuit. Optionally, the input/output interface is an input/output circuit.

According to a ninth aspect, a communication apparatus is provided, including: a transceiver unit, configured to receive a second message sent by an integrated access and backhaul IAB donor node, where the second message indicates to establish a local route between a first node and a second node, and the first node is an IAB node; and a processing unit, configured to establish the local route between the first node and the second node based on the second message, where the local route means that a data packet between the first node and the second node is locally forwarded by using the communication apparatus.

With reference to the ninth aspect, in some implementations of the ninth aspect, the second message includes one or more of the following:
 an identifier of the first node, an identifier of the second node, or a group identifier of a node group to which the second node belongs.

With reference to the ninth aspect, in some implementations of the ninth aspect, the communication apparatus is disposed on the IAB node, or the communication apparatus is the IAB node; or the communication apparatus is disposed on the IAB donor node, or the communication apparatus is the IAB donor node.

With reference to the ninth aspect, in some implementations of the ninth aspect, the second node includes a terminal device and/or the IAB node.

With reference to the ninth aspect, in some implementations of the ninth aspect, the first node is a node that accesses a network by using a 3GPP access technology, and the first node provides a relay service for a device that accesses the network by using a non-3GPP access technology.

With reference to the ninth aspect, in some implementations of the ninth aspect, the processing unit is further configured to start route learning for the first node; and/or the processing unit is further configured to generate a route forwarding table between the first node and the second node.

With reference to the ninth aspect, in some implementations of the ninth aspect, the transceiver unit is further configured to receive a data packet in a first format sent by the first node, where the first format corresponds to the 3GPP access technology, the data packet in the first format includes data sent by a third node to the second node, and the third node is a node that establishes a wireless connection to the first node by using the non-3GPP access technology; and the processing unit is further configured to locally forward the data packet in the first format to the second node.

With reference to the ninth aspect, in some implementations of the ninth aspect, the first format corresponds to user plane configuration of the first node.

According to a tenth aspect, a communication apparatus is provided, including a processor. The processor is coupled to a memory, and is configured to execute instructions in the memory, to implement the foregoing method according to any one of the third aspect and the possible implementations of the third aspect. Optionally, the communication apparatus further includes the memory. Optionally, the communication apparatus further includes a communication interface, and the processor is coupled to the communication interface.

In some embodiments, the communication apparatus is a local routing node. When the communication apparatus is the local routing node, the communication interface is a transceiver or an input/output interface.

In some embodiments, the communication apparatus is a chip disposed in the local routing node. When the communication apparatus is the chip disposed in the local routing node, the communication interface is an input/output interface.

Optionally, the transceiver is a transceiver circuit. Optionally, the input/output interface is an input/output circuit.

According to an eleventh aspect, a communication apparatus is provided, including: a transceiver unit, configured to receive a data packet in a second format sent by a third node, where the data packet in the second format includes first data, the first data is data sent by the third node to a second node, a local route between the communication apparatus and the second node has been established, and the local route means that a data packet between the communication apparatus and the second node is locally forwarded by using a local routing node; and a processing unit, configured to generate a data packet in a first format, where the data packet in the first format includes the first data. The transceiver unit is further configured to send the data packet in the first format to the local routing node.

Optionally, the communication apparatus is an IAB node or the communication apparatus is disposed on the IAB node.

With reference to the eleventh aspect, in some implementations of the eleventh aspect, the processing unit is configured to perform format conversion on the data packet in the second format to obtain the data packet in the first format.

With reference to the eleventh aspect, in some implementations of the eleventh aspect, the communication apparatus and/or the second node are/is a node that accesses a network by using a 3GPP access technology, and the first format corresponds to the 3GPP access technology.

With reference to the eleventh aspect, in some implementations of the eleventh aspect, the first format corresponds to user plane configuration of the communication apparatus.

With reference to the eleventh aspect, in some implementations of the eleventh aspect, the third node is a node that establishes a wireless connection to the communication apparatus by using a non-3GPP access technology, and the second format corresponds to the non-3GPP access technology.

With reference to the eleventh aspect, in some implementations of the eleventh aspect, the local routing node is an integrated access and backhaul IAB node or an IAB donor node.

With reference to the eleventh aspect, in some implementations of the eleventh aspect, the second node includes a terminal device and/or the IAB node.

According to a twelfth aspect, a communication apparatus is provided, including a processor. The processor is coupled to a memory, and is configured to execute instructions in the memory, to implement the foregoing method according to any one of the fourth aspect and the possible implementations of the fourth aspect. Optionally, the communication apparatus further includes the memory. Optionally, the communication apparatus further includes a communication interface, and the processor is coupled to the communication interface.

In some embodiments, the communication apparatus is a first node. When the communication apparatus is the first node, the communication interface is a transceiver or an input/output interface.

In some embodiments, the communication apparatus is a chip disposed on the first node. When the communication apparatus is the chip disposed on the first node, the communication interface is an input/output interface.

Optionally, the transceiver is a transceiver circuit. Optionally, the input/output interface is an input/output circuit.

According to a thirteenth aspect, a processor is provided, including an input circuit, an output circuit, and a processing circuit. The processing circuit is configured to: receive a signal through the input circuit, and transmit the signal through the output circuit, to enable the processor to perform the method according to any one of the first aspect to the fourth aspect and the possible implementations of the first aspect to the fourth aspect.

In a implementation process, the processor is one or more chips, the input circuit is an input pin, the output circuit is an output pin, and the processing circuit is a transistor, a gate circuit, a trigger, any logic circuit, or the like. An input signal received by the input circuit is received and input by, for example, but not limited to, a receiver, a signal output by the output circuit is output to, for example, but not limited to, a transmitter and transmitted by the transmitter, and the input circuit and the output circuit is a same circuit, where the circuit is used as the input circuit and the output circuit at different moments. Implementations of the processor and the various circuits are not limited.

According to a fourteenth aspect, a processing apparatus is provided, including a processor and a memory. The processor is configured to: read instructions stored in the memory, receive a signal through a receiver, and transmit a signal through a transmitter, to perform the method according to any one of the first aspect to the fourth aspect and the possible implementations of the first aspect to the fourth aspect.

Optionally, there are one or more processors, and there are one or more memories.

Optionally, the memory is integrated with the processor, or the memory and the processor are disposed separately.

In a implementation process, the memory is a non-transitory (non-transitory) memory, for example, a read-only memory (read-only memory, ROM). The memory and the processor is integrated into a same chip, or is disposed in different chips. A type of the memory and a manner in which the memory and the processor are disposed are not limited.

In some embodiments, a related data exchange process, for example, sending indication information, is a process of outputting the indication information from the processor, and receiving capability information is a process of receiving the input capability information by the processor. Specifically, data output by the processor is output to the transmitter, and input data received by the processor is from the receiver. The transmitter and the receiver is collectively referred to as a transceiver.

The processing apparatus according to the fourteenth aspect is one or more chips. The processor in the processing apparatus is implemented by using hardware, or is implemented by using software. When the processor is implemented by using hardware, the processor is a logic circuit, an integrated circuit, or the like. When the processor is implemented by using software, the processor is a general-purpose processor, and is implemented by reading software code stored in a memory. The memory is integrated into the processor, or is located outside the processor and exist independently.

According to a fifteenth aspect, a computer program product is provided. The computer program product includes a computer program (which further is referred to as code or instructions). When the computer program is run, a computer is enabled to perform the method according to any one of the first aspect to the fourth aspect and the possible implementations of the first aspect to the fourth aspect.

According to a sixteenth aspect, a computer-readable storage medium is provided. The computer-readable storage medium stores a computer program (which further is referred to as code or instructions). When the computer program is run on a computer, the computer is enabled to perform the method according to any one of the first aspect to the fourth aspect and the possible implementations of the first aspect to the fourth aspect.

According to a seventeenth aspect, a communication system is provided, including the foregoing IAB donor node, core network network element, local routing node, and first node.

BRIEF DESCRIPTION OF DRAWINGS

FIG. 2A and FIG. 2B are a schematic flowchart of a communication method in accordance with some embodiments;

DESCRIPTION OF EMBODIMENTS

The following describes technical solutions with reference to the accompanying drawings.

In some embodiments, names of nodes and messages are names set for ease of description, and is different in a network. In some embodiments, the names of the nodes and the messages are limited, any name that has a function the same as or similar to that of the node or the message used is considered as a method or an equivalent replacement, and falls within the protection scope. Details are not described below again.

In some embodiments, a node that supports integrated access and backhaul is referred to as a wireless backhaul node, and the wireless backhaul node further is referred to as a relay node (relay node, RN) or an IAB node (IAB node). For ease of description, the IAB node is used as an example for description below.

Figure 1:
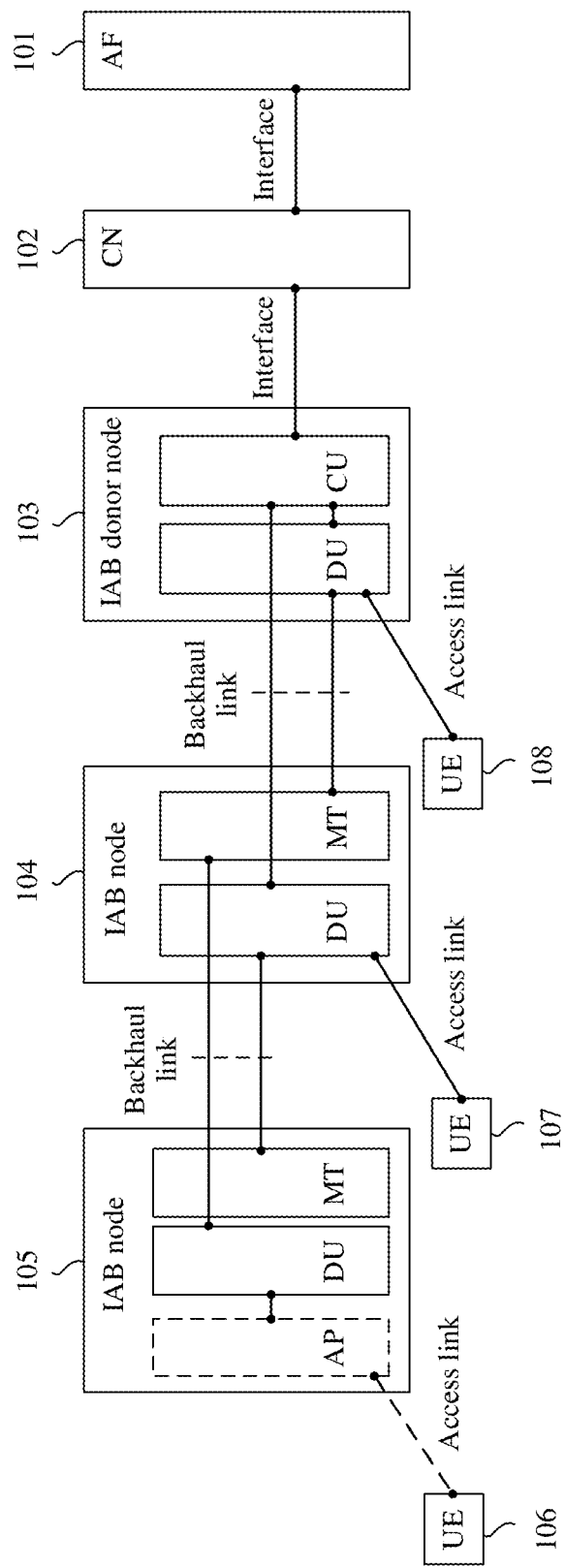
FIG. 1 a schematic block diagram of a communication system in accordance with some embodiments.

FIG. 1 a schematic block diagram of a communication system in accordance with some embodiments.

As shown in FIG. 1, the communication system includes an application function network element 101, a core network 102, an IAB donor node (IAB-donor) 103, one or more IAB nodes (IABnodes), such as an IAB node 104 and an IAB node 105, and alternatively includes one or more terminal devices (user equipment, UE), such as UE 106 to UE 108. The IAB donor node is connected to a core network (core network, CN), provides an access service for a terminal device, and further provides a backhaul egress to the core network for an IAB node. The IAB node is not directly connected to the core network, but is connected to the IAB donor node by using a (single-hop or multi-hop) wireless backhaul link, and the IAB donor node performs backhaul to the core network. The IAB node provides an access service for the terminal device, and further provides relay of a backhaul link for another IAB node.

The LAB donor node is further referred to as an IAB donor (IAB donor) or a donor gNodeB (donor gNodeB, DgNB). Specifically, the IAB donor node is an access network element having a complete base station function, or is an access network element in a form in which a centralized unit (centralized unit, CU) and a distributed unit (distributed unit, DU) are separated. An IAB donor node CU alternatively is in a form in which a control plane (control plane, CP) and a user plane (user plane, UP) are separated. For example, one IAB donor CU includes one CU-CP and a plurality of CU-UPs. This is not limited in this embodiment. The IAB node includes two parts: a mobile termination (mobile termination, MT) and a DU. A function of the MT part is equivalent to that of the terminal device, and the IAB node is connected to an upper-layer IAB node or the IAB donor node by using the MT. A function of the DU part is the same as that of a common DU, and the IAB node is connected to the terminal device or a lower-layer IAB node by using the DU. Specifically, a communication interface (for example, an F1 interface) is included between a CU of the IAB donor node and a DU of the IAB node, and a communication interface (for example, a Uu interface) is included between a DU of the LAB donor node or the DU of the IAB node and the MT of the lower-layer IAB node.

The communication system alternatively includes one IAB node. The IAB node accesses a network by using a 3rd Generation Partnership Project (3rd generation partnership project, 3GPP) access technology, and provides a relay service for a device that accesses the network by using a non-3GPP access technology. For example, the IAB node 105 shown in FIG. 1. The IAB node 105 is configured to have a function of an access point (access point, AP) of the non-3GPP access technology (for example, a Wi-Fi access technology), and the UE 106 establishes an access link with the IAB node by using the non-3GPP access technology. On the access link of the non-3GPP access technology, data of the UE 106 is forwarded to a 3GPP network by using the IAB node 105. Alternatively, the IAB node 105 is disposed separately from the access point (access point, AP) of the non-3GPP access technology and establish a connection to the access point. A device that accesses a network by using the non-3GPP access technology forwards data to the 3GPP network by using the IAB node 105.

The terminal device in some embodiments further is referred to as user equipment (user equipment, UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device in some embodiments are a mobile phone (mobile phone), a tablet computer (pad), a computer having a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem, a vehicle-mounted device, a wearable device, a terminal device in a 5G network, a terminal device in a future evolved public land mobile network (public land mobile network, PLMN), or the like.

The wearable device further is referred to as a wearable intelligent device, and is a general term of wearable devices such as glasses, gloves, watches, clothes, and shoes that are developed by applying wearable technologies in intelligent designs of daily wear. The wearable device is a portable device that is directly worn on a body or integrated into clothes or an accessory of a user. The wearable device is a hardware device, but further implements a powerful function through software support, data exchange, and cloud interaction. In a broad sense, wearable intelligent devices include full-featured and large-sized devices that implements complete or partial functions without depending on smartphones, such as smart watches or smart glasses, and devices that focus on one type of application function and need to work with other devices such as smartphones, such as various smart bands or smart jewelry for monitoring physical signs.

In addition, the terminal device alternatively is a terminal device in an internet of things (internet of things, IoT) system. The IoT is a part of future information technology development. A main technical feature of the IoT is to connect things to a network by using a communication technology, to implement an intelligent network for human-machine interconnection and thing-thing interconnection.

In some embodiments, a specific form of the terminal device is not limited.

Figure 2A:
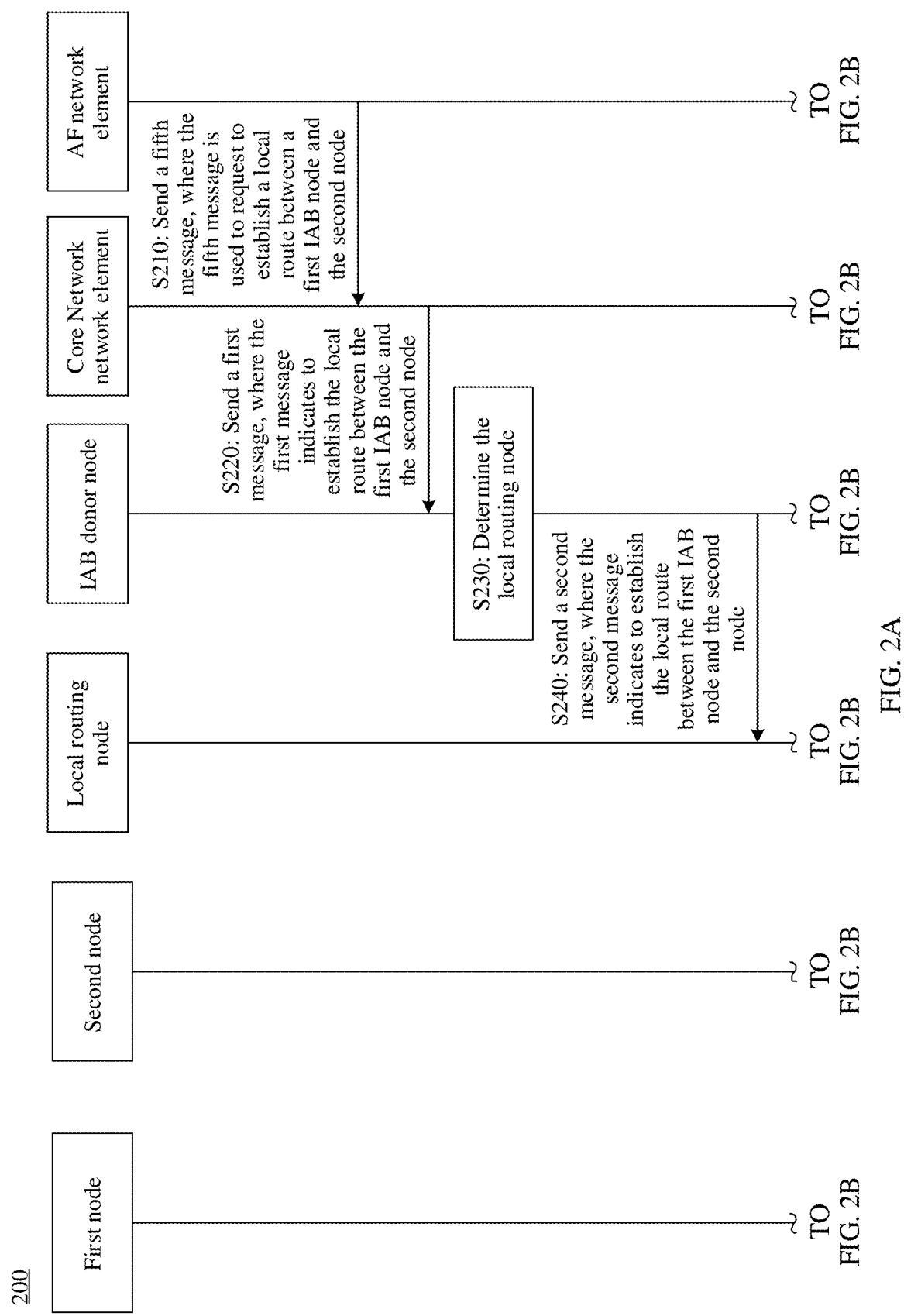
Figure 3:
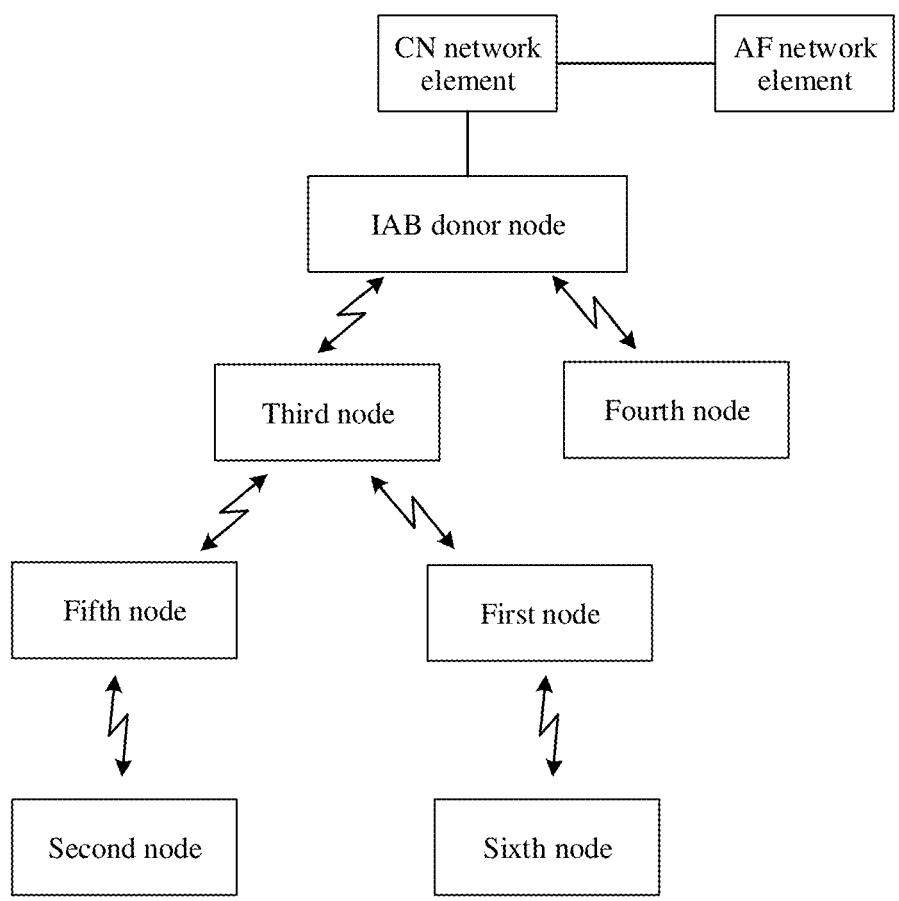
FIG. 3 is a schematic diagram of a structure of a communication method in accordance with some embodiments.

For ease of description, the following briefly describes terms used in some embodiments.
Upper-Layer Node A previous hop of a node in a downlink is a parent node of the node, or is referred to as a parent node. A multi-hop node before the node is an ancestor node of the node. In other words, a next hop of a node in an uplink is a parent node of the node, and a multi-hop node after the node is an ancestor node of the node. In some embodiments, an upper-layer node of a node includes a parent node and an ancestor node of the node.
Lower-Layer Node A next hop of a node in a downlink is a child node of the node, or is referred to as a child node. A multi-hop node after the node is a descendent node of the node. In other words, a previous hop of a node in an uplink is a child node of the node, and a multi-hop node before the node is a descendent node of the node. In some embodiments, a lower-layer node of a node includes a child node and a descendent node of the node. FIG. 2A and FIG. 2B are a schematic flowchart of a communication method in accordance with some embodiments. A network architecture between nodes and network elements in FIG. 2A and FIG. 2B is shown in FIG. 3. Information exchange between an application function (application function, AF) network element and a core network (core network, CN) network element, and between the CN element and an IAB donor node is wired communication. Communication is performed between the IAB donor node and a lower-layer node and between lower-layer nodes of the IAB donor node by using a wireless backhaul link or an access link. In FIG. 3, an example in which IAB nodes are cascaded in a spanning tree manner is used. The IAB nodes alternatively is cascaded in a directed acyclic graph (directed acyclic graph, DAG) manner. However, this is not limited thereto.

The method shown in FIG. 2A and FIG. 2B includes S210 to S280. The following describes in detail the steps of the method.

S210: The AF network element sends a fifth message to the core network network element, where the fifth message is used to request to establish a local route between a first node and a second node.

The core network network element receives the fifth message sent by the AF network element, where the fifth message is used to request to establish the local route between the first node and the second node, and the first node is an IAB node. By way of example, and not limitation, the second node is a terminal device, or is an IAB node.

The local route means that a data packet between the first node and the second node is locally forwarded by using a local routing node, and does not need to pass through an upper-layer node of the local routing node. For example, a node A establishes a local route with a node B. When the node A sends a data packet to a local routing node, and a destination address of the data packet is an address of the node B, the local routing node forwards the data packet to the node B according to a route forwarding table. The data packet does not need to be forwarded by an upper-layer node of the local routing node, so that a communication latency is reduced. In addition, after the node A establishes the local route with the node B, if the node A or the node B further includes a lower-layer node, a data packet between the node A and the node B and a data packet between the lower-layer nodes of the node A and the node B alternatively is locally forwarded by using the local routing node of the node A and the node B, and does not need to be forwarded by using the upper-layer node of the local routing node.

By way of example, and not limitation, the first node is a node that accesses a network by using a 3GPP access technology, and the first node provides a relay service for a device that accesses the network by using a non-3GPP access technology.

For example, in FIG. 3, a first node accesses a 3GPP network by using the 3GPP access technology, and a sixth node accesses the network by using the non-3GPP access technology. For example, the sixth node establishes a wireless connection to the first node by using a Wi-Fi technology. The first node is an IAB node that has a function of a Wi-Fi access point, in other words, the sixth node accesses the first node by using the Wi-Fi access technology; or the sixth node accesses a Wi-Fi access point by using the Wi-Fi access technology. The first node establishes a connection to the Wi-Fi access point, in other words, the first node provides a 3GPP network service for the sixth node directly or by using the Wi-Fi access point.

In some embodiments, the second node is a node that needs to establish the local route for the first node. The fifth message is used to establish the local route between the first node and the second node. In implementation, the fifth message is used to establish a local route between the first node and one second node, or the fifth message is used to establish local routes between the first node and a plurality of second nodes.

In some embodiments, the fifth message includes an identifier of the first node.

In other words, the fifth message is used to request to establish a local route between the first node and another node (that is, an example of the second node) that has established a session in the core network. After receiving the fifth message, a core network network element considers that the AF network element requests to establish the local route between the first node and the another node that has established the session in the core network.

For example, a node group for which a local route has been established is preconfigured in the core network network element. A node in the node group is the second node. Optionally, an identifier of one or more nodes included in the node group is further included. After receiving the fifth message, the core network network element determines that the first node needs to be added to the node group, in other words, a local route between the first node and a node (that is, another example of the second node) in the node group is established.

For another example, after receiving the fifth message, the core network network element determines a node that establishes the local route with the first node, and provides, for the first node and the node that establishes the local route with the first node, a service for establishing the local route.

By way of example, and not limitation, the identifier of the first node is one of a generic public subscription identifier (generic public subscription identifier, GPSI), an international mobile subscriber identity (international mobile subscriber identity, IMSI), or an international mobile equipment identity (international mobile equipment identity, IMEI).

In some embodiments, the fifth message includes the identifier of the first node and a group identifier of the node group to which the second node belongs.

For example, a node group including a plurality of second nodes is a node group A, in other words, the first node needs to establish a local route with the node group A. The fifth message includes the identifier of the first node and a group identifier of the node group A, and the fifth message is used to request to establish the local route between the first node and the node group A. The node group A is a group of nodes between which a local route has been established. In other words, the fifth message indicates to add the first node to the node group A, in other words, the fifth message is used to request to establish a local route of the node group A including the first node. Alternatively, the fifth message is used to request to establish a local route between the first node and each node in the node group.

In some embodiments, the fifth message includes the identifier of the first node and an identifier of the second node.

For example, the second node is a node that needs to establish a local route with the first node, and the fifth message includes the identifier of the first node and an identifier of each of one or more second nodes. The fifth message is used to request to establish a local route between the first node and the one or more second nodes, in other words, the fifth message is used to request the first node to establish a local route with each of the one or more second nodes. Alternatively, the fifth message alternatively is used to request to establish local routes between the first node and any two nodes of the one or more second nodes. In other words, the fifth message includes a plurality of node identifiers, including the identifier of the first node and the identifier of the second node, and the fifth message is used to request to establish local routes of the plurality of nodes.

Optionally, after receiving the fifth message, the core network network element generates association information between the first node and the second node, or generates association information between the first node and a node group to which the second node belongs.

For example, after receiving the fifth message, the core network network element establishes a mapping relationship between an identifier of the first node and an identifier of the second node, and generates mapping relationship information, that is, the association information. The association information is used to identify that the first node and the second node need to establish the local route. The second node associated with the first node is found based on the mapping relationship information by using the identifier of the first node, or the identifier of the first node is found based on the identifier of the second node.

For another example, after receiving the fifth message, the core network network element establishes a mapping relationship between an identifier of the first node and a group identifier of the node group to which the second node belongs, and generates mapping relationship information, that is, the association information. The association information is used to identify that the first node and the node group to which the second node belongs need to establish the local route. A second node group to which the second node belongs and that is associated with the first node is found based on the mapping relationship information by using the identifier of the first node, or the identifier of the first node is found based on the group identifier of the second node group.

By way of example, and not limitation, when the second node is the IAB node, a control plane and a network management plane of the core network are unified, that is, management and control are integrated. The core network learns of information about the IAB node, and provide a service for establishing the local route between the first node and the second node based on the request of the fifth message.

S220: The CN element sends a first message to the IAB donor node, where the first message indicates to establish the local route between the first node and the second node.

The IAB donor node receives the first message sent by the CN element, and determines a node that needs to establish the local route.

In some embodiments, the first message includes the identifier of the first node.

After receiving the first message including the identifier of the first node, the IAB donor node determines that a local routing relationship between the first node and a node (that is, another example of the second node) under the IAB donor node needs to be established.

For example, if the IAB donor node includes a node group A for which the local route has been established, the IAB donor node considers that the first node needs to be added to the node group A.

For another example, after receiving the first message, the IAB donor node determines a node that establishes the local route with the first node, and provides, for the first node and the node that establishes the local route with the first node, a service for establishing the local route.

In some embodiments, the first message includes the identifier of the first node and the group identifier of the node group to which the second node belongs.

For example, the first message indicates the first node to join the node group A including the plurality of second node groups, in other words, indicate the first node to establish a local route with a node included in the node group A. In other words, the first message indicates the node group A to establish the local route after the first node joins the node group A. Alternatively, the first message indicates to establish the local route between the first node and each node in the node group.

In some embodiments, the first message includes the identifier of the first node and the identifier of the second node.

For example, the first message includes the identifier of the first node and an identifier of each of the one or more second nodes. The first message indicates to establish the local route between the first node and the one or more second nodes. In other words, the first message includes a plurality of node identifiers, including the identifier of the first node and the identifier of the second node, and the first message indicates to establish local routes of the plurality of nodes. Alternatively, the first message alternatively indicates to establish local routes between the first node and any two nodes of the one or more second nodes.

In some embodiments, the first message includes association information generated by the core network device. The IAB donor node determines, based on the association information, that the local route between the first node and the second node needs to be established, or the IAB donor node determines, based on the association information, that the first node needs to be added to the node group to which the second node belongs.

S230: The IAB donor node determines the local routing node.

After the IAB donor node determines the local route that needs to be established between the first node and the second node, the IAB donor node determines, based on a topology relationship between lower-layer nodes of the IAB donor node, a local routing node that provides a local routing service for data communication between the first node and the second node. Specifically, the IAB donor node determines a common upper-layer node of the first node and the second node based on the topology relationship between lower-layer nodes of the IAB donor node, and then selects a local routing node used to forward data between the first node and the second node.

By way of example, and not limitation, the local routing node of the first node and the second node is a smallest common upper-layer node of the first node and the second node.

For example, in FIG. 3, if the local route between the first node and the second node needs to be established, the AF network element sends the fifth message to the core network network element to request to establish the local route between the first node and the second node. After receiving the fifth message, the core network network element generates the first message, and sends the first message to the IAB donor node to indicate the IAB donor node to establish the local route between the first node and the second node. The IAB donor node determines, based on the topology relationship between the lower-layer nodes, that the common upper-layer node of the first node and the second node includes a third node and the IAB donor node. The IAB donor node selects a smallest common node between the first node and the second node as the local routing node between the first node and the second node, so that after the local route between the first node and the second node is established, a data packet between the first node and the second node and a data packet between the lower-layer nodes of the first node and the second node are forwarded by using the third node without using an upper-layer node of the third node. For example, a data packet sent by the sixth node to the second node is sent to the third node by using the first node, and the third node performs local routing and forwards the data packet to the second node by using the fifth node, to implement local routing.

Figure 4:
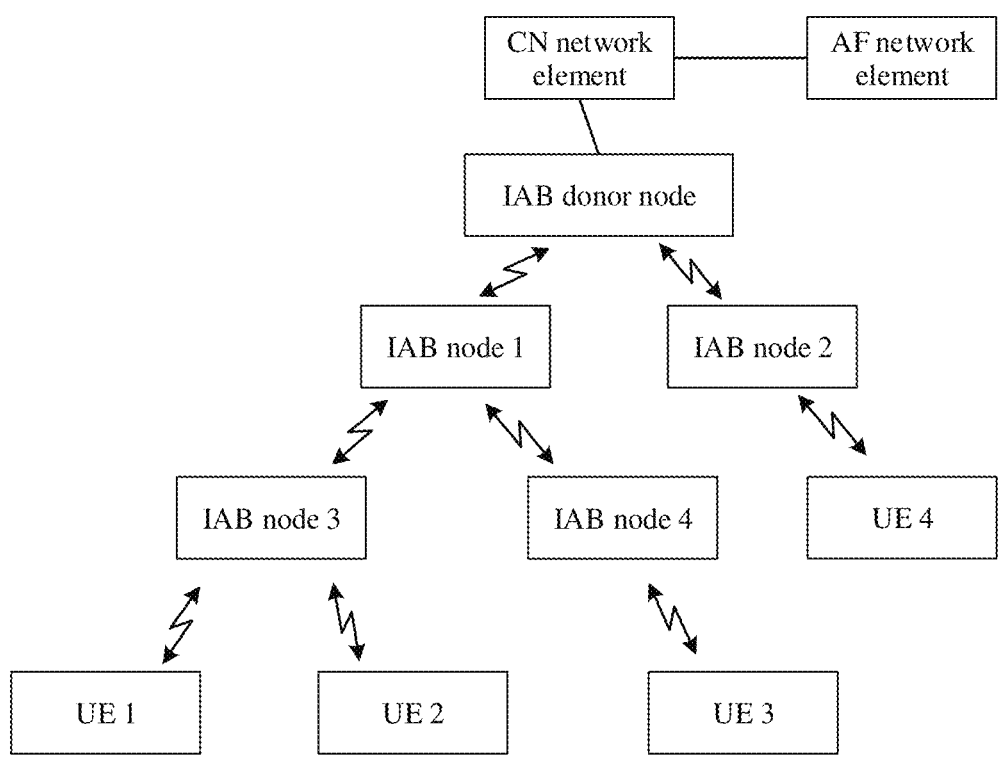
FIG. 4 is another schematic diagram of a structure of a communication method in accordance with some embodiments.

For another example, as shown in FIG. 4, a local route has been established between UE 1 and UE 2, a local routing node between UE 1 and UE 2 is an IAB node 3, a local routing node group including UE 1 and UE 2 is referred to as a node group A, and an AF network element sends a fifth message to a core network network element to request an IAB node 4 (that is, an example of the first node) to join the node group A. To be specific, UE 1 and UE 2 are second nodes, the first node, that is, the IAB node 4, needs to establish local routes with the two second nodes: UE 1 and UE 2. The AF network element requests the IAB node 4 to establish the local routes with UE 1 and UE 2. The fifth message includes an identifier of the IAB node 4, and optionally, the fifth message further includes an identifier of the node group A, and/or identifiers of UE 1 and UE 2. The core network network element generates the first message to indicate the IAB donor node to establish a local routing node between the IAB node 4 and UE 1 and UE 2. In other words, the first message indicates the IAB donor node to add the IAB node 4 to the node group A and establishes a local route of the node group A. After receiving the first message, the IAB donor node determines, based on a topology relationship between lower-layer nodes of the IAB donor node, common upper-layer nodes of the IAB node 4, UE 1, and UE 2, including the IAB donor node and an IAB node 1. The IAB donor node selects one of the IAB donor node and the IAB node 1 as the local routing node of the IAB node 4, and UE 1 and UE 2. For example, the IAB donor node selects the IAB node 1 as the local routing node. In other words, the IAB donor node selects the IAB node 1 as the local routing node of the node group A after the IAB node 4 joins the node group A. The IAB node 1 serves as the local routing node between the IAB node 4 and UE 1 and UE 2, so that a data packet between the IAB node 4 and UE 1 and UE 2 and a data packet between a lower-layer node UE 3 of the IAB node 4 and UE 1 and UE 2 is forwarded by using the IAB node 1 without passing through an upper-layer node of the IAB node 1. UE 1, UE 2, and the IAB node 4 are nodes that access the network by using the 3GPP access technology, and UE 3 is a node that accesses the network by using the non-3GPP access technology. The IAB node 4 is configured to have a function of an AP of the non-3GPP access technology, and UE 3 establishes an access link with the IAB node by using the non-3GPP access technology. On the access link of the non-3GPP access technology, data of the UE 3 is forwarded to the 3GPP network by using the IAB node 4. Alternatively, the IAB node 4 is disposed separately from and establish a connection to the AP of the non-3GPP access technology, and after accessing the AP, UE 3 forwards data to the 3GPP network by using the IAB node 4. After the IAB node 4 establishes the local routes with UE 1 and UE 2 by using the local routing node IAB node 1, a communication data packet between UE 3 and UE and UE 2 is locally routed and forwarded by using the IAB node 1 without passing through the upper-layer node of the IAB node 1. In this way, a local route is established between a node using the non-3GPP access technology and a node in the 3GPP network, to reduce a communication latency.

Because the local routing node is the IAB node 3 before the IAB node 4 joins the node group A, the local routing node changes to the IAB node 1 after the IAB node 4 joins the node group A, and the local routing node of the node group A changes. Optionally, the IAB donor node indicates the IAB node 3 to delete a local routing rule of UE 2 and UE 3. To be specific, after the local routing rule is deleted, data between UE 2 and UE 3 is not locally forwarded by the IAB node 3 (in other words, a data packet sent by UE 1 to UE 2 is forwarded by the IAB node 3 to UE 2, or a data packet sent by UE 2 to UE 1 is forwarded by the IAB node 3 to UE 1), but is forwarded by the IAB node 3 to the IAB node 1, and then the IAB node 1 performs local routing and forwarding. Alternatively, the IAB donor node does not indicate the IAB node 3 to delete the local routing rule of the IAB node 3, the data packet between UE 1 and UE 2 is still locally routed and forwarded by the IAB node 3, and the data packet between UE 1 and UE 2, and the IAB node 4 is locally routed and forwarded by the IAB node 1. However, this is not limited thereto.

S240: The IAB donor node sends a second message to the local routing node of the first node and the second node selected by the IAB donor node, where the second message indicates to establish the local route between the first node and the second node.

The second message indicates to establish the local route between the first node and the second node includes that the second message indicates the local routing node to update the local routing rule, in other words, the data packet between the first node and the second node is locally routed and forwarded by the node that receives the second message. The second message indicates to establish the local route between the first node and the second node includes that the second message indicates the local routing node to learn a route of the first node, or to enable a routing capability of the local routing node for the first node, for example, learn a MAC address or an IP address of the first node, or learn a MAC address or an IP address of a terminal device that establishes a wireless connection to the first node by using the non-3GPP access technology, and generates a routing entry.

S250: The local routing node establishes the local route between the first node and the second node.

After receiving the second message sent by the IAB donor node, the local routing node determines to establish the local route between the first node and the second node on the local routing node. The local routing node learns of the MAC address or the IP address of the first node, or learns of the MAC address or the IP address of the terminal device that accesses the first node by using the non-3GPP access technology, and generates the routing entry, so that the data packet between the first node and the second node is locally routed and forwarded by the local routing node without the upper-layer node of the local routing node.

Optionally, the IAB donor node sends an indication message to the first node, where the indication message indicates the first node to learn a route of the local routing node, or enable a routing capability of the first node for the local routing node, for example, learn the MAC address or the IP address of the first node, or learn the MAC address or the IP address of the terminal device that accesses the first node by using the non-3GPP access technology, and generates a MAC address routing entry. In addition, the indication message further indicates to enable a data exchange capability of the first node. The data exchange capability is encapsulating a data packet of a terminal device using the non-3GPP access technology into a PDCP/SDAP data packet, and decapsulating the PDCP/SDAP data packet into a data packet that is decoded by the terminal device using the non-3GPP access technology. For example, an Ethernet frame of UE that uses the Wi-Fi access technology is encapsulated into the PDCP/SDAP data packet, and the PDCP/SDAP data packet is encapsulated into the Ethernet frame.

Optionally, after the local route between the first node and the second node is successfully established, the local routing node starts to return, to the upper-layer node, an acknowledgement message indicating that the local routing node is successfully established, so that the one or more upper-layer nodes including the IAB donor node and the core network network element determine that the local route between the first node and the second node is successfully established.

S260: The first node sends a data packet to the local routing node, where a destination address of the data packet is the second node.

The data packet sent by the first node to the local routing node is a data packet sent by the first node to the second node, or is a data packet sent by the lower-layer node of the first node to the second node, and is forwarded by the first node, in other words, a relay service is provided by the first node.

Optionally, the first node provides the relay service for the third node, and the data packet sent by the first node to the local routing node includes data sent by the third node to the second node.

By way of example, and not limitation, the third node establishes a wireless connection to the first node by using the non-3GPP access technology, and the first node provides the relay service for the third node.

After receiving a data packet sent by the third node, the first node forwards the data packet to the local routing node, where the data packet sent by the third node to the first node is a data packet in a second format, and the data packet in the second format includes the data sent by the third node to the second node. The second format corresponds to the non-3GPP access technology. For example, if the non-3GPP access technology is the Wi-Fi access technology, the second format is the Ethernet frame. After receiving the data packet in the second format, the first node determines that the data packet needs to be transferred to the 3GPP network, and then generates a data packet in a first format based on the data packet. The first format corresponds to the 3GPP access technology. Specifically, the first format corresponds to user plane configuration of the first node. For example, the data packet in the first format is the PDCP/SDAP data packet. In other words, the first node converts the data packet in the second format sent by the third node into the data packet in the first format corresponding to a user plane resource of the first node, so that data of the third node is transmitted in the 3GPP network by using the user plane resource of the first node. For example, the data of the third node is transmitted in the 3GPP network by using a user plane resource such as a data radio bearer (data radio bear, DRB) and/or radio link control (radio link control, RLC) of the first node.

In addition, the first node further transfers, to the third node, a data packet sent by a node in the 3GPP network to the third node, including converting the data packet in the first format into the data packet in the second format and sending the data packet in the second format to the third node.

After the data packet sent by the first node is transferred to the local routing node, in other words, after the local routing node receives the data packet sent by the first node, the local routing node performs S270.

S270: The local routing node determines, based on the destination address and the local routing entry that are included in the data packet, the local route to forward the data packet.

S280: The local routing node performs local routing and forwards the data packet sent by the first node to the second node.

The local routing node parses out that the destination address in the data packet is the destination address of the second node. Because the local routing node has established the local route between the first node and the second node, after searching for the local routing entry, the local routing node performs local routing and forwarding, based on an indication of the entry, on the data packet sent by the first node to the second node, and sends the data packet to the second node without passing through the upper-layer node of the local routing node.

Similar to the data packet sent by the second node to the first node, the data packet is locally routed and forwarded by using the local routing node without passing through the upper-layer node of the local routing node, so that a latency of the data packet is reduced.

The method 200 shown in FIG. 2A and FIG. 2B is used when the local route is established for the first node for the first time, and the fifth message is a local route establishment request message. The method 200 shown in FIG. 2A and FIG. 2B alternatively is used when the local route of the first node is modified, and the fifth message is a local route update request message or a local route modification request message. Alternatively, a message for establishing the local route for the first time and a message for modifying or updating the local route is carried in a same message. This is not limited.

Figure 5:
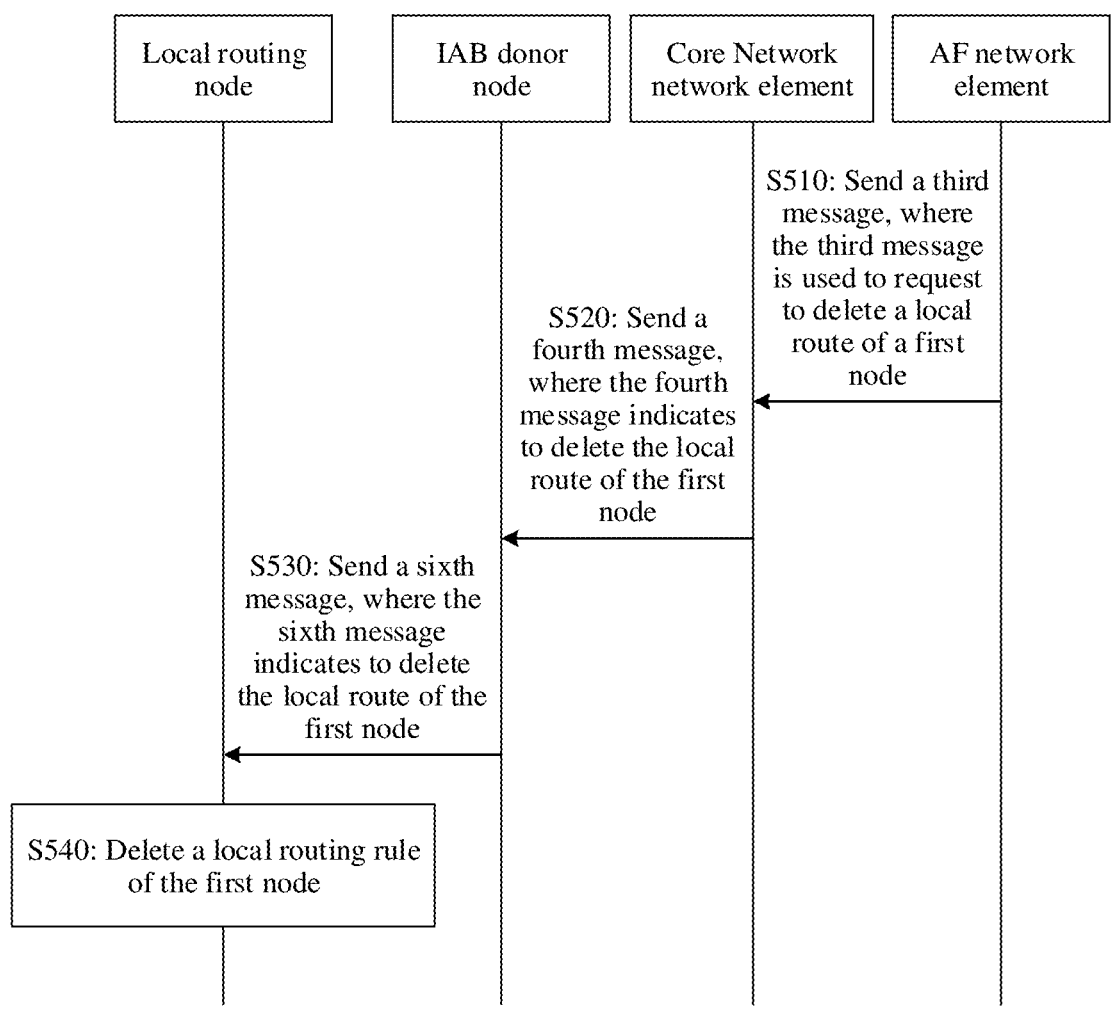
FIG. 5 is a schematic block diagram of an example of a communication apparatus in accordance with some embodiments.

FIG. 5 is another schematic flowchart of a communication method in accordance with some embodiments.

In some embodiments, a same or similar part of the method shown in FIG. 5 and the method shown in FIG. 2A and FIG. 2B, refer to the foregoing descriptions of the method shown in FIG. 2A and FIG. 2B. For brevity, details are not described herein again.

S510: An AF network element sends a third message to a core network network element, where the third message is used to delete a local route of a first node.

After receiving the third message, the core network network element determines that the AF network element requests to delete the local route of the first node.

In some embodiments, the third message includes an identifier of the first node. The core network network element determines, by using the third message, that the AF network element requests to delete local routes of the first node.

In some embodiments, the third message includes the identifier of the first node and a group identifier of a local routing node group A to which the first node belongs. The core network network element determines, by using the third message, that the AF network element requests to delete the first node in the node group A. In other words, the third message is used to request to delete a local route between the first node and another node in the node group A.

Optionally, the third message further includes an identifier of a node in the node group A.

In some embodiments, the third message includes the identifier of the first node and identifiers of one or more second nodes.

The core network network element determines, by using the third message, that the AF network element requests to delete a local route between the first node and the one or more second nodes.

By way of example, and not limitation, the third message is a local route deletion request message.

S520: The core network network element sends a fourth message to an IAB donor node, where the fourth message indicates to delete the local route of the first node.

S530: The IAB donor node sends a sixth message to a local routing node, where the sixth message indicates to delete the local route of the first node.

After receiving the fourth message, the IAB donor node determines that the local route of the first node needs to be deleted.

In some embodiments, the fourth message includes the identifier of the first node. The IAB donor node determines, based on the fourth message, that the local routes of the first node need to be deleted, and the IAB donor node determines a local routing node that provides the local routing service for the first node, and sends the sixth message to the local routing node, to indicate to delete the local route of the first node.

In some embodiments, the fourth message includes the identifier of the first node and the identifier of the node group A to which the first node belongs. The IAB donor node determines, based on the fourth message, that the first node needs to be deleted from the node group A, that is, the local route between the first node and the another node in the node group A is deleted. The IAB donor node determines a local routing node of the node group A, and sends the sixth message to the local routing node, to indicate to delete the local route of the first node.

Optionally, the fourth message further includes the identifier of the node in the node group A.

Optionally, the IAB donor node selects a local routing node for the node group A from which the first node is deleted. When the local routing node of the node group A changes, the IAB donor node sends, to a new local routing node, an indication message for establishing the local route of the node group A.

In some embodiments, the fourth message includes the identifier of the first node and the identifiers of the one or more second nodes. The IAB donor node determines, based on the fourth message, that the local route between the first node and the one or more second nodes needs to be deleted, and the IAB donor node determines the local routing node that provides the local routing service for the first node, and sends the sixth message to the local routing node, to indicate to delete the local route of the first node.

S540: After receiving the sixth message, the local routing node deletes a local routing entry of the first node, or delete a local routing rule of the first node. After receiving the sixth message, the local routing node further disables a route learning capability for the first node and disable a data exchange capability.

The foregoing describes in detail the method provided in some embodiments with reference to FIG. 2A and FIG. 2B to FIG. 5. The apparatuses provided in some embodiments are described below in detail with reference to FIG. 6 and FIG. 7.

Figure 6:
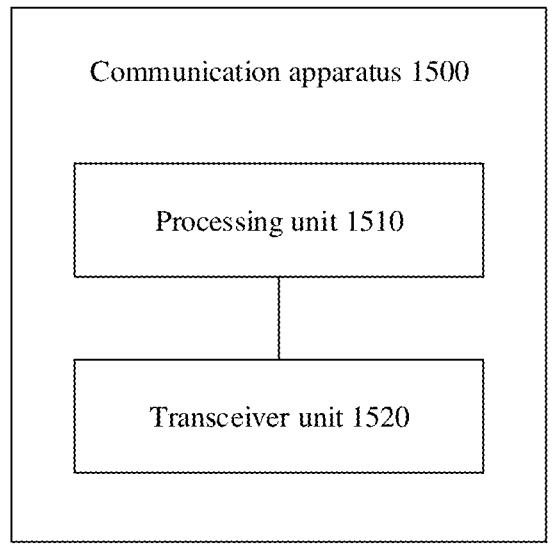
FIG. 6 is a schematic diagram of a structure of an example of a communication apparatus in accordance with some embodiments.

FIG. 6 is a schematic block diagram of a communication apparatus according to some embodiments. As shown in FIG. 6, a communication apparatus 1500 includes a processing unit 1510 and a transceiver unit 1520.

In a possible design, the communication apparatus 1500 corresponds to the IAB donor node in the foregoing method embodiments, for example, is the IAB donor node or a chip disposed in a terminal device.

The communication apparatus 1500 corresponds to the IAB donor node in the methods 200 and 500 according to some embodiments, and the communication apparatus 1500 includes units configured to perform the method performed by the IAB donor node in the method 200 in FIG. 2A and FIG. 2B and the method 500 in FIG. 5. In addition, the units in the communication apparatus 1500 and the foregoing other operations and/or functions are respectively used to implement corresponding procedures in the method 200 in FIG. 2A and FIG. 2B and the method 500 in FIG. 5.

When the communication apparatus 1500 is configured to perform the method 200 in FIG. 2A and FIG. 2B, the transceiver unit 1520 is configured to perform S220 and S240 in the method 200, and the processing unit 1510 is configured to perform S230 in the method 200. When the communication apparatus 1500 is configured to perform the method 500 in FIG. 5, the transceiver unit 1520 is configured to perform S520 and S530 in the method 500. In some embodiments, a process of performing a corresponding step by each unit has been described in detail. For brevity, details are not described herein again.

Figure 7:
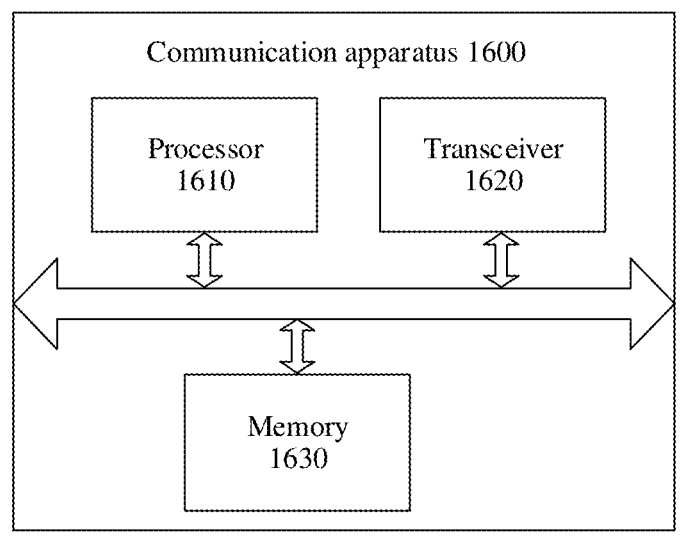
FIG. 7 is a schematic diagram of a structure of an example of a communication apparatus in accordance with some embodiments.

In some embodiments, when the communication apparatus 1500 is the IAB donor node, the transceiver unit 1520 in the communication apparatus 1500 corresponds to a transceiver 1620 in a communication apparatus 1600 shown in FIG. 7, and the processing unit 1510 in the communication apparatus 1500 corresponds to a processor 1610 in the communication apparatus 1600 shown in FIG. 7.

In some embodiments, when the communication apparatus 1500 is the IAB donor node, the transceiver unit 1520 in the communication apparatus 1500 is implemented by using a communication interface (for example, a transceiver or an input/output interface). For example, the transceiver unit 1520 in the communication apparatus 1500 corresponds to the transceiver 1620 in the communication apparatus 1600 shown in FIG. 7. The processing unit 1510 in the communication apparatus 1500 is implemented by using at least one processor, for example, corresponds to the processor 1610 in the communication apparatus 1600 shown in FIG. 7. Alternatively, the processing unit 1510 in the communication apparatus 1500 is implemented by using at least one logical circuit.

Optionally, the communication apparatus 1500 further includes the processing unit 1510. The processing unit 1510 is configured to process instructions or data, to implement a corresponding operation.

Optionally, the communication apparatus 1500 further includes a storage unit. The storage unit is configured to store instructions or data. The processing unit invokes the instructions or the data stored in the storage unit, to implement a corresponding operation. For example, the storage unit corresponds to a memory 1630 in the communication apparatus 1600 shown in FIG. 7, and the storage unit in the communication apparatus 1500 is implemented by using at least one memory.

In some embodiments, a process of performing a corresponding step by each unit has been described in detail. For brevity, details are not described herein again.

In another possible design, the communication apparatus 1500 corresponds to the core network network element in the foregoing method embodiments, for example, is the core network network element or a chip disposed in the core network network element.

In some embodiments, the communication apparatus 1500 corresponds to the core network network element in the methods 200 and 500, and the communication apparatus 1500 includes units configured to perform the method performed by the core network network element in the method 200 in FIG. 2A and FIG. 2B and the method 500 in FIG. 5. In addition, the units in the communication apparatus 1500 and the foregoing other operations and/or functions are respectively used to implement corresponding procedures in the method 200 in FIG. 2A and FIG. 2B and the method 500 in FIG. 5.

When the communication apparatus 1500 is configured to perform the method 200 in FIG. 2A and FIG. 2B, the transceiver unit 1520 is configured to perform S210 and S220 in the method 200. When the communication apparatus 1500 is configured to perform the method 500 in FIG. 5, the transceiver unit 1520 is configured to perform S510 and S520 in the method 500. In some embodiments, a process of performing a corresponding step by each unit has been described in detail. For brevity, details are not described herein again.

In some embodiments, when the communication apparatus 1500 is the core network network element, the transceiver unit 1520 in the communication apparatus 1500 corresponds to a transceiver 1620 in a communication apparatus 1600 shown in FIG. 7, and the processing unit 1510 in the communication apparatus 1500 corresponds to a processor 1610 in the communication apparatus 1600 shown in FIG. 7.

In some embodiments, when the communication apparatus 1500 is the core network network element, the transceiver unit 1520 in the communication apparatus 1500 is implemented by using a communication interface (for example, a transceiver or an input/output interface). For example, the transceiver unit 1520 in the communication apparatus 1500 corresponds to the transceiver 1620 in the communication apparatus 1600 shown in FIG. 7. The processing unit 1510 in the communication apparatus 1500 is implemented by using at least one processor, for example, corresponds to the processor 1610 in the communication apparatus 1600 shown in FIG. 7. Alternatively, the processing unit 1510 in the communication apparatus 1500 is implemented by using at least one logical circuit.

Optionally, the communication apparatus 1500 further includes the processing unit 1510. The processing unit 1510 is configured to process instructions or data, to implement a corresponding operation.

Optionally, the communication apparatus 1500 further includes a storage unit. The storage unit is configured to store instructions or data. The processing unit invokes the instructions or the data stored in the storage unit, to implement a corresponding operation. For example, the storage unit corresponds to a memory 1630 in the communication apparatus 1600 shown in FIG. 7, and the storage unit in the communication apparatus 1500 is implemented by using at least one memory.

In some embodiments, a process of performing a corresponding step by each unit has been described in detail. For brevity, details are not described herein again.

In another possible design, the communication apparatus 1500 corresponds to the local routing node in the foregoing method embodiments, for example, is the local routing node or a chip disposed on the local routing node.

In some embodiments, the communication apparatus 1500 corresponds to the local routing node in the methods 200 and 500, and the communication apparatus 1500 includes units configured to perform the method performed by the local routing node in the method 200 in FIG. 2A and FIG. 2B and the method 500 in FIG. 5. In addition, the units in the communication apparatus 1500 and the foregoing other operations and/or functions are respectively used to implement corresponding procedures in the method 200 in FIG. 2A and FIG. 2B and the method 500 in FIG. 5.

When the communication apparatus 1500 is configured to perform the method 200 in FIG. 2A and FIG. 2B, the transceiver unit 1520 is configured to perform S240, S260 and S280 in the method 200, and the processing unit 1510 is configured to perform S250 and S270 in the method 200. When the communication apparatus 1500 is configured to perform the method 500 in FIG. 5, the transceiver unit 1520 is configured to perform S530 in the method 500, and the processing unit 1510 is configured to perform S540 in the method 500. In some embodiments, a process of performing a corresponding step by each unit has been described in detail. For brevity, details are not described herein again.

In some embodiments, when the communication apparatus 1500 is the local routing node, the transceiver unit 1520 in the communication apparatus 1500 corresponds to a transceiver 1620 in a communication apparatus 1600 shown in FIG. 7, and the processing unit 1510 in the communication apparatus 1500 corresponds to a processor 1610 in the communication apparatus 1600 shown in FIG. 7.

In some embodiments, when the communication apparatus 1500 is the local routing node, the transceiver unit 1520 in the communication apparatus 1500 is implemented by using a communication interface (for example, a transceiver or an input/output interface). For example, the transceiver unit 1520 in the communication apparatus 1500 corresponds to the transceiver 1620 in the communication apparatus 1600 shown in FIG. 7. The processing unit 1510 in the communication apparatus 1500 is implemented by using at least one processor, for example, corresponds to the processor 1610 in the communication apparatus 1600 shown in FIG. 7. Alternatively, the processing unit 1510 in the communication apparatus 1500 is implemented by using at least one logical circuit.

Optionally, the communication apparatus 1500 further includes a processing unit 1510. The processing unit 1510 is configured to process instructions or data, to implement a corresponding operation.

Optionally, the communication apparatus 1500 further includes a storage unit. The storage unit is configured to store instructions or data. The processing unit invokes the instructions or the data stored in the storage unit, to implement a corresponding operation. For example, the storage unit corresponds to a memory 1630 in the communication apparatus 1600 shown in FIG. 7, and the storage unit in the communication apparatus 1500 is implemented by using at least one memory.

In some embodiments, a process of performing a corresponding step by each unit has been described in detail. For brevity, details are not described herein again.

In another possible design, the communication apparatus 1500 corresponds to the first node in the foregoing method embodiments, for example, is the first node or a chip disposed on the first node.

The communication apparatus 1500 corresponds to the first node in the method 200 according to some embodiments, and the communication apparatus 1500 includes units configured to perform the method performed by the first node in the method 200 in FIG. 2A and FIG. 2B. In addition, the units in the communication apparatus 1500 and the foregoing other operations and/or functions are respectively used to implement corresponding procedures in the method 200 in FIG. 2A and FIG. 2B.

When the communication apparatus 1500 is configured to perform the method 200 in FIG. 2A and FIG. 2B, the transceiver unit 1520 is configured to perform S260 in the method 200. In some embodiments, a process of performing a corresponding step by each unit has been described in detail. For brevity, details are not described herein again.

In some embodiments, when the communication apparatus 1500 is the first node, the transceiver unit 1520 in the communication apparatus 1500 corresponds to a transceiver 1620 in a communication apparatus 1600 shown in FIG. 7, and the processing unit 1510 in the communication apparatus 1500 corresponds to a processor 1610 in the communication apparatus 1600 shown in FIG. 7.

In some embodiments, when the communication apparatus 1500 is the first node, the transceiver unit 1520 in the communication apparatus 1500 is implemented by using a communication interface (for example, a transceiver or an input/output interface). For example, the transceiver unit 1520 in the communication apparatus 1500 corresponds to the transceiver 1620 in the communication apparatus 1600 shown in FIG. 7. The processing unit 1510 in the communication apparatus 1500 is implemented by using at least one processor, for example, corresponds to the processor 1610 in the communication apparatus 1600 shown in FIG. 7. Alternatively, the processing unit 1510 in the communication apparatus 1500 is implemented by using at least one logical circuit.

Optionally, the communication apparatus 1500 further includes a processing unit 1510. The processing unit 1510 is configured to process instructions or data, to implement a corresponding operation.

Optionally, the communication apparatus 1500 further includes a storage unit. The storage unit is configured to store instructions or data. The processing unit invokes the instructions or the data stored in the storage unit, to implement a corresponding operation. For example, the storage unit corresponds to a memory 1630 in the communication apparatus 1600 shown in FIG. 7, and the storage unit in the communication apparatus 1500 is implemented by using at least one memory.

In some embodiments, a process of performing a corresponding step by each unit has been described in detail. For brevity, details are not described herein again.

The processor 1610 in FIG. 7 and the memory 1630 is integrated into one processing apparatus. The processor 1610 is configured to execute program code stored in the memory 1630 to implement the foregoing functions. During implementation, the memory 1630 alternatively is integrated into the processor 1610, or is independent of the processor 1610. The processor 1610 corresponds to the processing unit in FIG. 6.

The transceiver 1620 in FIG. 7 corresponds to the transceiver unit in FIG. 6. The transceiver 2020 includes a receiver (or referred to as a receiver machine or a receiver circuit) and a transmitter (or referred to as a transmitter machine or a transmitter circuit). The receiver is configured to receive a signal, and the transmitter is configured to transmit a signal.

Some embodiments further provides a processing apparatus, including a processor and an interface. The processor is configured to perform the method in any one of the foregoing method embodiments.

In some embodiments, the processing apparatus is one or more chips. For example, the processing apparatus is a field programmable gate array (field programmable gate array, FPGA), an application-specific integrated circuit (application-specific integrated circuit, ASIC), a system on chip (system on chip, SoC), a central processing unit (central processor unit, CPU), a network processor (network processor, NP), a digital signal processing circuit (digital signal processor, DSP), a micro controller unit (micro controller unit, MCU), a programmable logic device (programmable logic device, PLD), or another integrated chip.

In some embodiments process, steps in the foregoing methods is implemented by using a hardware integrated logical circuit in the processor, or by using instructions in a form of software. The steps of the method disclosed with reference to some embodiments are directly performed and completed by a hardware processor, or are performed and completed by using a combination of hardware and software modules in the processor. The software module is located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with the hardware of the processor. To avoid repetition, details are not described herein again.

In some embodiments, the processor is an integrated circuit chip and has a signal processing capability. In some embodiments process, steps of the foregoing method embodiments are implemented by using an integrated logic circuit of hardware in the processor or by using instructions in a form of software. The foregoing processor is a general-purpose processor, a digital signal processor (DSP), an application-specific integrated circuit (ASIC), a field programmable gate array (FPGA) or another programmable logic device, a discrete gate or a transistor logic device, or a discrete hardware component. The processor implements or performs the methods, steps, and logical block diagrams that are disclosed in some embodiments. The general-purpose processor is a microprocessor, or the processor is any conventional processor or the like. The steps of the methods disclosed with reference to some embodiments are directly performed and completed by a hardware decoding processor, or is performed and completed by using a combination of hardware in a decoding processor and a software module. The software module is located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with the hardware of the processor.

In some embodiments, the memory is a volatile memory or a non-volatile memory, or includes a volatile memory and a non-volatile memory. The non-volatile memory is a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory is a random access memory (random access memory, RAM), used as an external cache. Through example but not limitative description, many forms of RAMs is used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM). In some embodiments, the memory of the systems and methods described include but is not limited to these and any memory of another appropriate type.

According to the method provided some embodiments further provide a computer program product. The computer program product includes computer program code. When the computer program code is run on a computer, the computer is enabled to perform the methods in the embodiments shown in FIG. 2A and FIG. 2B and FIG. 5.

According to the method provided some embodiments further provide a computer-readable medium. The computer-readable medium stores program code. When the program code is run on a computer, the computer is enabled to perform the methods in the embodiments shown in FIG. 2A and FIG. 2B and FIG. 5.

According to the methods provided some embodiments further provide a system. The system includes the foregoing one or more terminal devices and the foregoing one or more network devices.

The network device and the terminal device in the foregoing apparatus embodiments correspond to the network device and the terminal device in the method embodiments. A corresponding module or unit performs a corresponding step. For example, the communication unit (the transceiver) performs a receiving or sending step in the method embodiments, and a step other than the sending step and the receiving step is performed by the processing unit (the processor). For a function of a unit, refer to a corresponding method embodiment. There is one or more processors.

All or some of the foregoing embodiments is implemented by software, hardware, firmware, or any combination thereof. When software is used to implement embodiments, all or some of the embodiments are implemented in a form of a computer program product. The computer program product includes one or more computer instructions. When the computer instructions are loaded and executed on a computer, all or some of the procedures or functions according to some embodiments are generated. The computer is a general-purpose computer, a dedicated computer, a computer network, or another programmable apparatus. The computer instructions are stored in a computer-readable storage medium or are transmitted from one computer-readable storage medium to another computer-readable storage medium. For example, the computer instructions are transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium is any usable medium accessible by a computer, or a data storage device, such as a server or a data center, integrating one or more usable media. The usable medium is a magnetic medium (for example, a floppy disk, a hard disk, or a magnetic tape), an optical medium (for example, a high-density digital video disc (digital video disc, DVD)), a semiconductor medium (for example, a solid-state drive (solid state disc, SSD)), or the like.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the sending step and the receiving step is performed by the processing unit (the processor). For a function of a unit, refer to a corresponding method embodiment. There is one or more processors.

Terms such as "component", "module", and "system" used in this specification are used to indicate computer-related entities, hardware, firmware, combinations of hardware and software, software, or software being executed. For example, a component is, but is not limited to, a process that runs on a processor, a processor, an object, an executable file, an execution thread, a program, and/or a computer. As illustrated by using figures, both a computing device and an application that runs on the computing device is components. One or more components resides within a process and/or a thread of execution, and a component is located on one computer and/or distributed between two or more computers. In addition, these components are executed from various computer-readable media that store various data structures. The components communicates by using a local and/or remote process and based on, for example, a signal having one or more data packets (for example, data from two components interacting with another component in a local system and/or a distributed system, and/or across a network such as the internet interacting with other systems by using the signal).

A person of ordinary skill in the art is aware that, in combination with the examples described in embodiments disclosed in this specification, units and algorithm steps are implemented by electronic hardware or a combination of computer software and the electronic hardware. Whether the functions are performed by hardware or software depends on particular applications and design constraints of the technical solutions. A person skilled in the art uses different methods to implement the described functions for each particular application, but the implementation going beyond the scope of the embodiments is unconsidered.

A person skilled in the art that, for the purpose of convenient and brief description, for a detailed working process of the foregoing system, apparatus, and unit, refer to a corresponding process in the foregoing method embodiments. Details are not described herein again.

In the several embodiments provided the disclosed system, apparatus, and method is implemented in other manners. For example, the foregoing apparatus embodiments are examples. For example, division of the units is logical function division and is other division during implementation. For example, a plurality of units or components are combined or integrated into another system, or some features are ignored or not performed. In addition, the displayed or discussed mutual couplings or direct couplings or communication connections are implemented through some interfaces. The indirect couplings or communication connections between the apparatuses or units are implemented in an electrical form, a mechanical form, or another form.

The units described as separate parts are or are unable to be physically separate, and parts displayed as units are or are unable to be physical units, are located in one location, or are distributed on a plurality of network units. Some or all of the units are selected based on achieving the objectives of the solutions of the embodiments.

In addition, function units in some embodiments are integrated into one processing unit, or each of the units exists alone physically, or two or more units are integrated into one unit.

In the foregoing embodiments, all or a part of functions of functional units are implemented by using software, hardware, firmware, or any combination thereof. When software is used to implement embodiments, all or some of the embodiments are implemented in a form of a computer program product. The computer program product includes one or more computer instructions (programs). When the computer program instructions (programs) are loaded and executed on a computer, all or some of the procedures or functions according to some embodiments are generated. The computer is a general-purpose computer, a dedicated computer, a computer network, or another programmable apparatus. The computer instructions are stored in a computer-readable storage medium or is transmitted from one computer-readable storage medium to another computer-readable storage medium. For example, the computer instructions are transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium is any usable medium accessible by a computer, or a data storage device, such as a server or a data center, integrating one or more usable media. The usable medium is a magnetic medium (for example, a floppy disk, a hard disk, or a magnetic tape), an optical medium (for example, a DVD), a semiconductor medium (for example, a solid-state drive (solid state disk, SSD)), or the like.

When the functions are implemented in a form of a software functional unit and sold or used as an independent product, the functions are stored in a computer-readable storage medium. Based on such an understanding, the technical solutions in some embodiments, or the part contributing to the conventional technology, or some of the technical solutions are implemented in a form of a software product. The computer software product is stored in a storage medium, and includes several instructions for instructing a computer device (which is a personal computer, a server, a network device, or the like) to perform all or some of the steps of the methods described in some embodiments. The foregoing storage medium includes various media that stores program code, such as a USB flash drive, a removable hard disk, a read-only memory (Read-Only Memory, ROM), a random access memory (Random Access Memory, RAM), a magnetic disk, or an optical disc.

The foregoing descriptions are implementations in some embodiments, but are not intended to limit the protection scope. Any variation or replacement readily figured out by a person skilled in the art within the technical scope disclosed shall fall within the protection scope. Therefore, the protection scope shall be subject to the protection scope of the claims.

The invention claimed is:

1. A communication method, comprising:
receiving, by an integrated access and backhaul (IAB) donor node, a first message from a core network network element, wherein the first message indicates to establish a local route between a first node and a second node, and the first node is an IAB node; and
determining, by the IAB donor node, a local routing node based on the first message, wherein the local route is a route where a data packet between the first node and the second node is locally forwarded by using the local routing node.

2. The method according to claim 1, wherein:
the first message includes one or more of the following:
an identifier of the first node;
an identifier of the second node; or
a group identifier of a node group to which the second node belongs.

3. The method according to claim 1, wherein the first node is a node that accesses a network by using a 3rd Generation Partnership Project (3GPP) access technology, and the first node provides a relay service for a device that accesses the network by using a non-3GPP access technology.

4. The method according to claim 1, wherein the determining, by the IAB donor node, a local routing node based on the first message comprises:
determining, by the IAB donor node, the local routing node based on the first message and a topology relationship between lower-layer nodes of the IAB donor node, wherein
the local routing node is an upper-layer node of the first node and the second node.

5. The method according to claim 1, wherein the local routing node is a smallest upper-layer node of the first node and the second node.

6. The method according to claim 1, wherein:
the local routing node is the IAB node, the method further comprising:
sending, by the IAB donor node, a second message to the local routing node, wherein the second message indicates to establish the local route between the first node and the second node.

7. The method according to claim 6, wherein:
the second message includes one or more of the following:
an identifier of the first node;
an identifier of the second node; or
a group identifier of a node group to which the second node belongs.

8. The method according to claim 1, wherein the local routing node is the IAB node, the method further comprising:
starting, by the IAB donor node, route learning for the first node; or
generating, by the IAB donor node, a route forwarding table between the first node and the second node.

9. The method according to claim 1, wherein:
the second node includes a terminal device and/or the IAB node.

10. The method according to claim 1, further comprising:
receiving, by the IAB donor node, a third message from the core network network element, wherein the third message indicates to delete the local route between the first node and the second node; and
sending, by the IAB donor node, a fourth message to the local routing node, wherein the fourth message indicates the local routing node to delete the local route between the first node and the second node.

11. A communication apparatus, comprising
at least one processor, and
a memory coupled to the at least one processor and configured to store instructions for execution by the at least one processor to cause the at least one processor to:
receive a first message from a core network network element, wherein the first message indicates to establish a local route between a first node and a second node, and the first node is an IAB node; and
determine wherein the local route is a route where a data packet between the first node and the second node is locally forwarded by using a local routing node.

12. The communication apparatus according to claim 11, wherein:
the first message includes one or more of the following:
an identifier of the first node;
an identifier of the second node; or
a group identifier of a node group to which the second node belongs.

13. The communication apparatus according to claim 11, wherein the first node is a node that accesses a network by using a 3rd Generation Partnership Project (3GPP) access technology, and the first node provides a relay service for a device that accesses the network by using a non-3GPP access technology.

14. The communication apparatus according to claim 11, wherein the instructions further cause the at least one processor to:
determine the local routing node based on the first message and a topology relationship between lower-layer nodes of a IAB donor node, wherein the local routing node is a upper-layer node of the first node and the second node.

15. The communication apparatus according to claim 11, wherein:
the local routing node is a smallest upper-layer node of the first node and the second node.

16. The communication apparatus according to claim 11, wherein the instructions further cause the at least one processor to:
send a second message to the local routing node, wherein the second message indicates to establish the local route between the first node and the second node.

17. The communication apparatus according to claim 16, wherein:
the second message includes one or more of the following:
an identifier of the first node;
an identifier of the second node; or
a group identifier of a node group to which the second node belongs.

18. The communication apparatus according to claim 11, wherein the local routing node is the IAB node, the instructions further cause the at least one processor to execute at least one of the following:
start route learning for the first node; or
generate a route forwarding table between the first node and the second node.

19. The communication apparatus according to claim 11, wherein the instructions further cause the at least one processor to:

receive a third message from the core network network element, wherein the third message indicates to delete the local route between the first node and the second node; and send a fourth message to the local routing node, wherein the fourth message indicates the local routing node to delete the local route between the first node and the second node.

20. A chip, comprising:

at least one processor; and a communication interface, wherein the communication interface is configured to:
  receive a signal from a communication apparatus; and
  transmit the signal to the processor or send the signal from the processor to the communication apparatus; and the processor is configured to execute stored instructions to cause the processor to:
  receive a first message from a core network network element, wherein the first message indicates to establish a local route between a first node and a second node, and the first node is an integraed access and backhaul (IAB) node; and
  determine, a local routing node based on the first message, wherein the local route is a route where a data packet between the first node and the second node is locally forwarded by using the local routing node.

\* \* \* \* \*